(No Model.)

T. A. CROWLEY.
CLEANING SOIL PIPES AND TRAPS.

No. 390,210. Patented Oct. 2, 1888.

WITNESSES:
Gustave Dieterich
T. F. Bourne.

Figure 2:
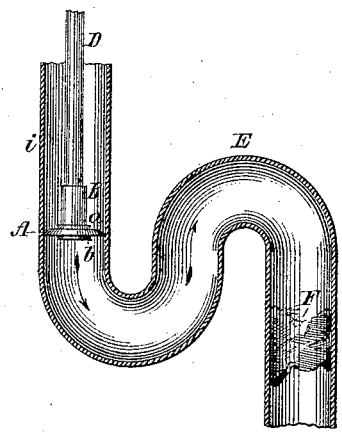
Figure 3:
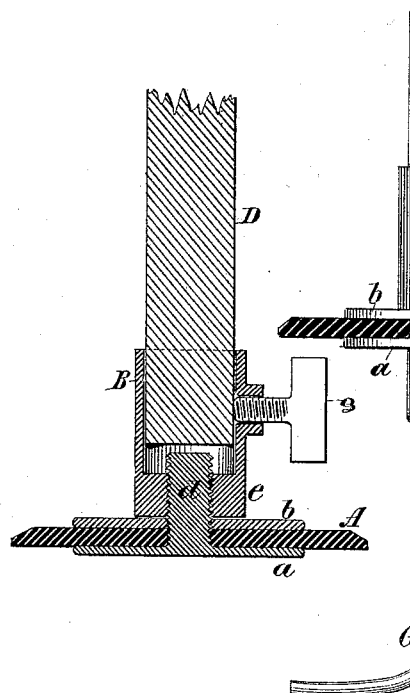

INVENTOR
Thomas A. Crowley.
BY
Briesen & Steele
ATTORNEYS.

ized to force an obstruction through the pipe,
as shown in Figs. 2 and 3.

UNITED STATES PATENT OFFICE.

THOMAS A. CROWLEY, OF BROOKLYN, NEW YORK, ASSIGNOR OF ONE-HALF TO BENJAMIN C. SMITH, OF SAME PLACE.

CLEANING SOIL-PIPES AND TRAPS.

SPECIFICATION forming part of Letters Patent No. 390,210, dated October 2, 1888.

Application filed December 6, 1887. Serial No. 257,078. (No model.)

*To all whom it may concern:*

Be it known that I, THOMAS A. CROWLEY, a resident of Brooklyn, Kings county, New York, have invented an Improved Tool for Cleaning Soil-Pipes and Traps, of which the following is a specification.

The object of my invention is to provide an improved device for removing obstructions, &c., from soil-pipes and traps.

The invention consists in the novel arrangement and combinations of parts that will be more fully hereinafter set forth.

Reference is to be had to the accompanying drawings, forming part of this specification, in which—

Figure 1:
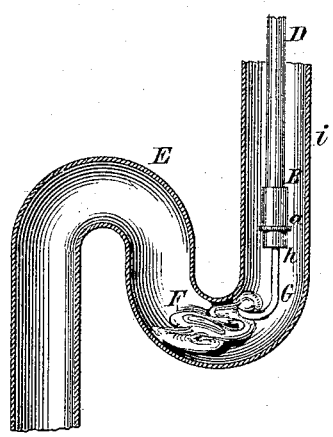
Figure 4:
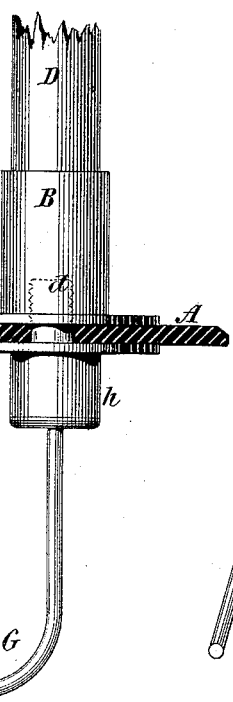
Figure 5:
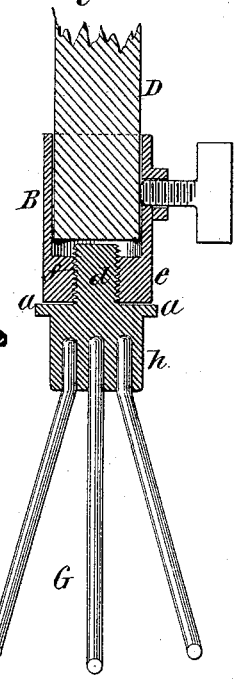

Figure 1 is a vertical central section through a soil-pipe trap, showing my improved tool in position for extracting an obstruction. Fig. 2 is a similar view to Fig. 1, showing the tool for forcing an obstruction through the pipe when it cannot be gripped by the tool shown in Fig. 1. Fig. 3 is a vertical central section through the tool for forcing the obstruction through the pipe. Fig. 4 is a side elevation, partly in section, of my improved pipe and trap cleaner; and Fig. 5 is a vertical central section of the withdrawing-tool, the gripping-fingers being shown in front view.

My improved tool is adapted to force obstructions through a soil-pipe and trap to clean the same; also, if the obstruction is in the near part of the trap, to grip the obstruction, which can then be withdrawn from the pipe with the tool.

In the accompanying drawings, A represents a disk of suitable dimensions, which is adapted to fit closely within the pipe or trap to be cleaned. This disk A is preferably made of rubber or leather, and it is to be quite stiff, but still flexible. The disk A is preferably carried between two other disks, *a b*, of smaller diameter, preferably of metal. The disk *a* carries a screw, *d*, which passes through the disks A *b*, as shown. The opening in the disk *b* through which the screw *d* passes is preferably threaded to match the screw *d*. By this means the disk *b* may be firmly pressed upon the disk A.

B is a sleeve or short tube, closed at one end by a cross-piece or plug, *e*. This plug *e* has an opening, *f*, which is screw-threaded to receive the screw *d*. (See Figs. 3 and 5.)

D is a pole or handle adapted to fit in the sleeve B.

*g* is a thumb-screw carried by the sleeve B, and adapted to be screwed up against the handle D to hold the sleeve B on the handle.

This improved tool is to be used as follows: E represents a soil-pipe or trap of ordinary construction. F represents an obstruction within said pipe. This obstruction is shown in Fig. 2 to be beyond the first or lower bend of the trap. To remove the obstruction the tool A B on the handle D is inserted in the upper leg, *i*, of the trap, or in the pipe connected therewith. The tool is then pressed downward within the pipe, which presses the water within the pipe or trap against the obstruction, forcing said obstruction along with the water. As the tool fits closely within the pipe, the water and obstruction will of necessity be forced through the pipe. The tool may then be readily removed from the pipe.

It often happens that the obstruction F will lie in or near the first bend of the trap E, as in Fig. 1. In this case I prefer to withdraw the obstruction from the trap or pipe. To accomplish this I secure to a disk, *a*, three (more or less) hooks or fingers, G. The disks A and *b* may then be dispensed with and the disk *a* have an enlarged part, *h*, to receive and hold the ends of the fingers G, as in Fig. 5; or the disks A and *b* may be left on the disk *a*, as in Fig. 4, the hooks G being secured to the disk *a* or part *h*, as shown. When the hooks or fingers G are used, the tool will be inserted in the pipe or trap E until the hooks G engage the obstruction. (See Fig. 1.) The tool will then be withdrawn, carrying the obstruction with it, thus cleaning the pipe.

When the handle D is removed, the tool shown in Fig. 3 makes a good plumber's candlestick. It is evident that the disk *b* and sleeve B could be made in one piece, if preferred; also, that the disk A could be riveted or otherwise firmly secured to the disk *b*. It is not essential that the screw *d* be integral with the disk *a*, as it could be a separate screw and pass through said disk.

If the disk *a* were dispensed with, the screw-head would rest against the disk A. In fact, the disk $a$ is but a screw-head. The sleeve B could be otherwise secured to the disk A than by screw $d$; but I prefer the construction shown.

The disk A is solid, so that when in use it will push the matter in a pipe in front of it, or draw such matter by suction.

Having now described my invention, what I claim is—

1. The combination, with the sleeve B, of the disk $a$, screw $d$, projecting from the disk $a$, for securing said disk to the sleeve, and hook G, carried by the disk $a$, substantially as described.

2. The combination of the disk A, disk $a$, carrying screw $d$, hooks G, carried by the disk $a$, and sleeve B, the screw $d$ connecting the disk $a$ to said sleeve, substantially as described.

THOMAS A. CROWLEY.

Witnesses:
GUSTAV SCHNEPPÉ,
HARRY M. TURK.